United States Patent
Yang et al.

(10) Patent No.: US 11,212,204 B2
(45) Date of Patent: Dec. 28, 2021

(54) METHOD, DEVICE AND SYSTEM FOR MONITORING NODE SURVIVAL STATE

(71) Applicant: XI'AN ZHONGXING NEW SOFTWARE CO., LTD., Shaanxi (CN)

(72) Inventors: Kun Yang, Guangdong (CN); Chen Lu, Guangdong (CN); Fang Xie, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 0 days.

(21) Appl. No.: 16/627,504

(22) PCT Filed: Feb. 7, 2018

(86) PCT No.: PCT/CN2018/075659
§ 371 (c)(1),
(2) Date: Dec. 30, 2019

(87) PCT Pub. No.: WO2019/000954
PCT Pub. Date: Jan. 3, 2019

(65) Prior Publication Data
US 2020/0169487 A1    May 28, 2020

(30) Foreign Application Priority Data
Jun. 30, 2017  (CN) .................. 201710524175.6
Jul. 25, 2017  (CN) .................. 201710612472.6

(51) Int. Cl.
*H04L 12/26*    (2006.01)
*H04L 12/24*    (2006.01)

(52) U.S. Cl.
CPC .......... *H04L 43/0817* (2013.01); *H04L 41/12* (2013.01); *H04L 43/0805* (2013.01); *H04L 43/0811* (2013.01)

(58) Field of Classification Search
CPC . H04L 41/12; H04L 41/0604; H04L 41/0813; H04L 43/0805; H04L 43/0811;
(Continued)

(56) References Cited

U.S. PATENT DOCUMENTS

2006/0224687 A1* 10/2006 Popkin .................. G06F 16/172
                                                    709/217
2014/0047550 A1*  2/2014 Chase ................. H04L 63/1441
                                                    726/26
(Continued)

FOREIGN PATENT DOCUMENTS

| CN | 103117901 A | 5/2013 |
| CN | 104506357 A | 4/2015 |

(Continued)

OTHER PUBLICATIONS

International Search Report for the International Patent Application No. PCT/CN2018/075659, dated Apr. 3, 2018, 2 pages.

*Primary Examiner* — Le H Luu
(74) *Attorney, Agent, or Firm* — Kacvinsky Daisak Bluni PLLC

(57) ABSTRACT

Provided are a method, device and system for monitoring an active state of a node. The method includes: a first node monitors an active state of a second node, where the first node and the second node are cooperative nodes to each other; when the active state indicates that the second node is offline, the first node transmits a notification message indicating that the second node is offline to a central node.

15 Claims, 5 Drawing Sheets

(58) Field of Classification Search
CPC ............. H04L 43/0817; H04L 63/1441; H04L 65/1066; G06F 11/1402; G06F 16/172; G08B 29/02; H04H 60/58; H04M 15/43; H04W 72/005
See application file for complete search history.

(56) References Cited

U.S. PATENT DOCUMENTS

| | | | |
|---|---|---|---|
| 2014/0280920 A1* | 9/2014 | Foley | H04L 43/0811 709/224 |
| 2014/0304756 A1* | 10/2014 | Fletcher | H04L 65/1066 725/115 |
| 2015/0019493 A1* | 1/2015 | Schindler | G06F 11/1402 707/649 |
| 2016/0164691 A1* | 6/2016 | Wang | H04M 15/43 370/259 |
| 2017/0048106 A1* | 2/2017 | Berry | H04L 41/0813 |
| 2018/0061214 A1* | 3/2018 | Vanchev | G08B 29/02 |
| 2018/0234911 A1* | 8/2018 | Zhao | H04W 72/005 |
| 2019/0104044 A1* | 4/2019 | Yang | H04L 41/0604 |
| 2019/0245635 A1* | 8/2019 | Verkasalo | H04H 60/58 |

FOREIGN PATENT DOCUMENTS

| | | |
|---|---|---|
| CN | 106656682 A | 5/2017 |
| WO | 2016192408 A1 | 12/2016 |

\* cited by examiner

METHOD, DEVICE AND SYSTEM FOR MONITORING NODE SURVIVAL STATE

CROSS-REFERENCE TO RELATED APPLICATIONS

This is a National Stage Application, filed under 35 U.S.C. 371, of International Patent Application No. PCT/CN2018/075659, filed on Feb. 7, 2018, which claims priority to Chinese patent applications No. 201710524175.6 filed on Jun. 30, 2017 and No. 201710612472.6 filed on Jul. 25, 2017, contents of all of which are incorporated herein by reference in their entireties.

TECHNICAL FIELD

The present disclosure relates to the field of communications and, in particular, to a method, device and system for monitoring an active state of a node.

BACKGROUND

In related art, a server is used to monitor an active state of a subordinate node, this kind of manner has high requirements on bandwidth and computing storage capacity of the server, which usually has slow response. Therefore, the node active monitoring technology in the related arts is not suitable for the situation that bandwidth and computing storage capacity of a central node are low, and a timely response is needed after a cooperative node is offline.

SUMMARY

Embodiments of the present disclosure provide a method, device and system for monitoring an active state of a node.

According to an embodiment of the present disclosure, a method for monitoring an active state of a node is provided, the method includes steps described below. A first node monitors an active state of the second node, where the first node and the second node are cooperative nodes to each other; when the active state indicates that the second node is offline, the first node transmits a notification message indicating that the second node is offline to a central node.

In an embodiment, after the first node transmits the notification message indicating that the second node is offline to the central node, the method further includes steps described below. The central node determines an offline state of the second node, and the central node adjusts a cooperation relationship of nodes subordinate to the central node according to a current topology state of a network comprising the first node and the second node, and a cooperative state of at least one of the first node or the second node.

In an embodiment, the step in which the central node determines the offline state of the second node includes steps described below. The central node performs an attempt to communicate with the second node; and when the attempt to communicate with the second node fails, the central node determines a current state of the second node as the offline state.

In an embodiment, the step in which the central node adjusts the cooperation relationship of the nodes subordinate to the central node according to the current topology state of the network and the cooperative state of the first node includes one of following steps. When the first node has at least one other active cooperative node, the central node keeps the cooperation relationship of the nodes subordinate to the central node; or when the first node has no other active cooperative node, the central node re-selects a cooperative node for the nodes subordinate to the central node.

In an embodiment, the step in which the central node adjusts the cooperation relationship of the nodes subordinate to the central node according to the current topology state of the network and the cooperative state of at least one of the first node or the second node includes one of following steps. When the first node has at least one other active cooperative node and the second node has no other active cooperative node, the central node keeps the cooperation relationship of the nodes subordinate to the central node; when the first node has at least one other active cooperative node and a third node has no other active cooperative node, the central node keeps the cooperation relationship of the nodes subordinate to the central node; or when the first node has no other active cooperative node, or the third node has no other active cooperative node, the central node re-selects a cooperative node for the nodes subordinate to the central node; where the third node is a cooperative node of the second node and is comprised in the network comprising the first node and the second node.

In an embodiment, before the first node transmits the notification message indicating that the second node is offline to the central node, the method further includes a step described below. The first node determines a current state of the second node as the offline state according to the active state.

In an embodiment, the step in which the first node monitors the active state of the second node includes a step described below. The first node monitors the active state of the second node according to received active information of the second node.

In an embodiment, the step in which the first node monitors the active state of the second node according to the received active information of the second node includes one of following steps. The first node monitors the active state of the second node according to first time between last reception of the active information of the second node from the first node and current reception of the active information of the second node from the first node; or the first node monitors the active state of the second node according to second time between last generation of the active information by the second node and current generation of the active information by the second node.

In an embodiment, the step in which the first node monitors the active state of the second node according to the received active information of the second node includes one of following steps. When the first time is less than a first threshold and the second time is less than a second threshold, the first node determines the active state of the second node as a normal state; when the first time is less than the first threshold and the second time is greater than or equal to the second threshold, the first node determines the active state of the second node as an abnormal state; when the first time is greater than or equal to the first threshold and the active state of the second node is the abnormal state in a last monitoring period, the first node determines the active state of the second node as an offline state; when the first time is greater than or equal to the first threshold and the active state of the second node is the normal state in the last monitoring period, it is determined whether the first time is greater than a third threshold, and when it is determined that the first time is less than the third threshold, the active state of the second node is determined as the abnormal state; or when the first time is greater than or equal to the first threshold and the active state of the second node is the normal state in the last monitoring period, it is determined whether the first time is greater than the third threshold, and when it is determined that the first time is greater than the third threshold, the active state of the second node is determined as the offline state.

In an embodiment, the third threshold is greater than each of the second threshold and the first threshold.

In an embodiment, the step in which the first node monitors the active state of the second node according to the received active information of the second node includes one of following steps. When the first time is less than the first threshold, the first node determines the active state of the second node as a normal state; and when the first time is greater than or equal to the first threshold, the first node determines the active state of the second node as an offline state.

Alternatively, the method further includes a step described below. The first node receives active information transmitted by the second node.

In an embodiment, the central node is a forth node in the same network with the first node and the second node.

In an embodiment, the central node is determined in a following manner, calculation according to a preset relationship, designation by the network or a user.

In an embodiment, each node includes one of a gateway or a terminal.

According to another embodiment of the present disclosure, a device for monitoring an active state of a node is provided, the device applied to a first node includes a monitoring module and a transmitting module. The monitoring module is configured to monitor an active state of the second node, where the first node and the second node are cooperative nodes to each other; the transmitting module is configured to transmit a notification message indicating that the second node is offline to a central node, when the active state indicates that the second node is offline.

According to another embodiment of the present disclosure, a system for monitoring an active state of a node is provided, the system includes a first node, a second node and a central node. The first node includes a monitoring module and a transmitting module. The monitoring module is configured to monitor an active state of the second node, where the first node and the second node are cooperative nodes to each other; and the transmitting module is configured to transmit a notification message indicating that the second node is offline to a central node, when the active state indicates that the second node is offline. The central node includes a determination module and a management module, the determination module is configured to determine an offline state of the second node, after receiving the notification message, and the management module is configured to adjust a cooperation relationship of nodes subordinate to the central node according to a current topology state of a network comprising the first node and the second node, and a cooperative state of at least one of the first node or the second node.

According to another embodiment of the present disclosure, a storage medium is further provided. The storage medium is configured to store program codes for executing steps described below.

An active state of a second node is monitored, where the first node and the second node are cooperative nodes to each other; and when the active state indicates that the second node is offline, a notification message indicating that the second node is offline is transmitted to a central node.

Through the present disclosure, the first node monitors the active state of the second node, where the first node and the second node are cooperative nodes to each other; when the active state indicates that the second node is offline, the first node transmits a notification message indicating that the second node is offline to a central node. Through mutual monitoring among nodes and transmitting to the central node, the response speed of the network to a node anomaly is improved.

BRIEF DESCRIPTION OF DRAWINGS

Drawings described herein are used to provide further understanding of the present disclosure and form a part of this application. The illustrative embodiments of the present disclosure and the description thereof are used to explain the present disclosure and do not constitute improper limitations to the present disclosure. In the drawings.

DETAILED DESCRIPTION

Hereinafter, the present disclosure will be described in detail with reference to the drawings and embodiments. It should be noted that the embodiments and features in this application may be combined with each other without conflict.

It should be noted that terms of "first", "second" and so on in the description, claims and drawings of the present disclosure are used to distinguish similar objects and are not necessarily used to describe a specific order or sequence.

Embodiment One

Figure 1:
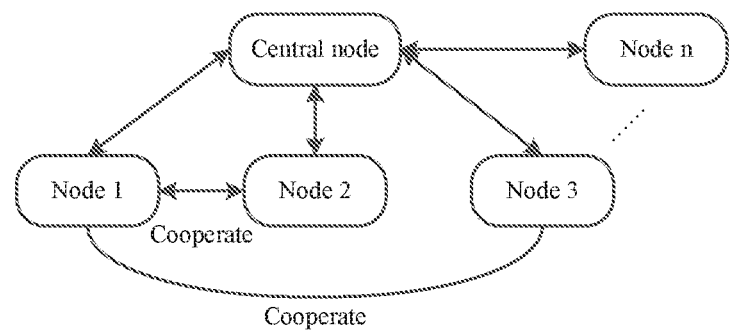
FIG. 1 is a network architecture diagram of embodiments of the present disclosure.

The embodiments of the present application may operate on the network architecture shown in FIG. 1, which is a network architecture diagram of the embodiments of the present disclosure, as shown in FIG. 1, the network architecture includes a central node, multiple nodes administrated by the central node, such as, node 1, node 2, and etc., there is a cooperation relationship among these nodes.

Figure 2:
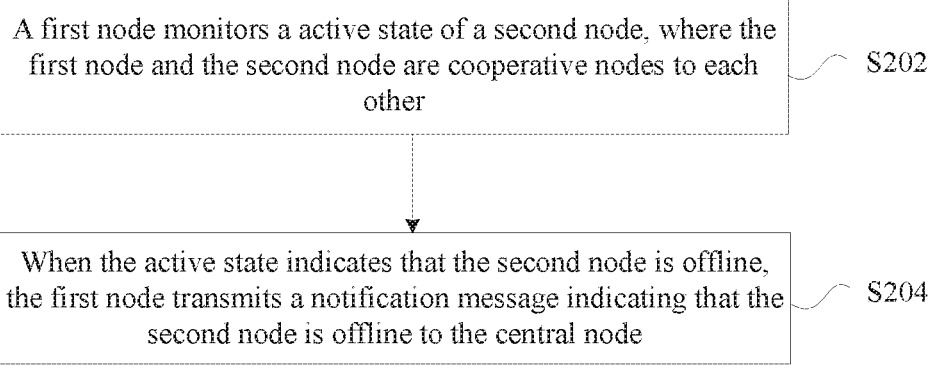
FIG. 2 is a flowchart of a method for monitoring an active state of a node according to an embodiment of the present disclosure.

This embodiment provides a method for monitoring an active state of a node operating on the above network architecture, FIG. 2 is a flowchart of a method for monitoring an active state of a node according to an embodiment of the present disclosure, as shown in FIG. 2, the flowchart includes steps described below.

Step S202, the first node monitors an active state of the second node, where the first node and the second node are cooperative nodes to each other.

Step S204: when the active state indicates that the second node is offline, the first node transmits a notification message indicating that the second node is offline to the central node.

Through the above steps, the first node monitors the active state of the second node, where the first node and the second node are cooperative nodes to each other; when the active state indicates that the second node is offline, the first node transmits a notification message indicating that the second node is offline to the central node. Through mutual monitoring among nodes and transmitting to the central node, the response speed of the network to a node anomaly is improved.

Alternatively, after the first node transmits the notification message indicating that the second node is offline to the central node, the method further includes steps described below.

S11, the central node determines an offline state of the second node;

S12, the central node adjusts a cooperation relationship of nodes subordinate to the central node according to a current topology state of a network comprising the first node and the second node, and a cooperative state of at least one of the first node or the second node.

In the present embodiment, the step in which the central node determines the offline state of the second node includes steps described below.

S21, the central node performs an attempt to communicate with the second node;

S22, when the attempt to communicate with the second node fails, the central node determines a current state of the second node as the offline state.

In this embodiment, the step in which the central node adjusts the cooperation relationship of the nodes subordinate to the central node according to the current topology state of the network and the cooperative state of the first node includes at least one of following steps.

When the first node has at least one other active cooperative node, that is, the first node has at least one other cooperative node expect the second node, the central node keeps the cooperation relationship of the nodes subordinate to the central node; and when the first node has no other active cooperative node, the central node re-selects a cooperative node for the nodes subordinate to the central node.

According to an alternative embodiment of the present embodiment, the step in which the central node adjusts the cooperation relationship of the nodes subordinate to the central node according to the current topology state of the network and the cooperative state of at least one of the first node or the second node includes steps described below.

When the first node has at least one other active cooperative node and the second node has no other active cooperative node, the central node keeps the cooperation relationship of the nodes subordinate to the central node;

when the first node has at least one other active cooperative node and a third node has no other active cooperative node, the central node keeps the cooperation relationship of the nodes subordinate to the central node;

when the first node has no other active cooperative node, or, the third node has no other active cooperative node, the central node re-selects a cooperative node for the nodes subordinate to the central node; where the third node is a cooperative node of the second node and is comprised in the network comprising the first node and the second node.

Alternatively, before the central node transmits the notification message indicating that the second node is offline, the method further includes a step described below. The first node determines a current state of the second node as the offline state according to the active state.

In an embodiment, the step in which the first node monitors the active state of the second node includes a step described below. The first node monitors the active state of the second node according to received active information of the second node. The active information includes time information of reception and generation.

Specifically, the step in which the first node monitors the active state of the second node according to the received active information of the second node includes two situations described below.

The first node monitors the active state of the second node according to first time between last reception of the active information of the second node from the first node and current reception of the active information of the second node from the first node; and the first node monitors the active state of the second node according to second time between last generation of the active information by the second node and current generation of the active information by the second node.

According to an alternative embodiment of the present embodiment, the step in which the first node monitors the active state of the second node according to the received active information of the second node includes situations described below.

When the first time is less than a first threshold and the second time is less than a second threshold, the first node determines the active state of the second node as a normal state;

when the first time is less than the first threshold and the second time is greater than or equal to the second threshold, the first node determines the active state of the second node as an abnormal state;

when the first time is greater than or equal to the first threshold and the active state of the second node is the abnormal state in a last monitoring period, the first node determines the active state of the second node as an offline state;

when the first time is greater than or equal to the first threshold and the active state of the second node is the normal state in the last monitoring period, it is determined whether the first time is greater than a third threshold, when it is determined that the first time is less than the third threshold, the active state of the second node is determined as the abnormal state; and when the first time is greater than or equal to the first threshold and the active state of the second node is the normal state in the last monitoring period, it is determined whether the first time is greater than the third threshold, and when it is determined that the first time is greater than the third threshold, the active state of the second node is determined as the offline state.

In an embodiment, the third threshold is greater than each of the second threshold and the first threshold, such as, the first threshold is 2 seconds, the second is 1 second, and the third threshold is 10 seconds.

According to another alternative embodiment of the present embodiment, the step in which the first node monitors the active state of the second node according to the received active information of the second node includes situations described below.

When the first time is greater than or equal to the first threshold, the first node determines the active state of the second node as the normal state; and when the first time is less than the first threshold, the first node determines the active state of the second node as the offline state.

Alternatively, the method further includes a step described below. The first node receives active information transmitted by the second node. Meanwhile, the first node also transmits active information to the second node.

In this embodiment, the central node is any node in a unified network, and may be, but is not limited to, a main node or a gateway node in the network, the central node is determined by one of following methods: calculation according to a preset relationship, or designation by the network or a user.

In this embodiment, each node, such as the first node, the second node, the third node, and etc., may be, but is not limited to following entities or software: a terminal or a gateway.

From the description of the above embodiments, those skilled in the art may clearly understand that the methods according to the above embodiments may be implemented by means of software plus necessary general-purpose hardware platforms, and of course, may also be implemented by means of hardware, but in many cases the former is a better embodiment. Based on this understanding, the technical solution of the present disclosure may be embodied in the form of a software product stored in a storage medium (e.g., a read-only memory (ROM)/random access memory (RAM), a magnetic disk, an optical disk), and include several instructions to cause a terminal device (e.g., a mobile phone, a computer, a server, a network device, etc.) to perform the methods described in various embodiments of the present disclosure.

Embodiment Two

The present embodiment further provides a device and a system for monitoring an active state of a node, to realize the above embodiments, the description, which has been made, will not be repeated here. As used below, a term of "module" may be a combination of at least one of software and hardware that implements a predetermined function. Although the device described in following embodiments may be implemented in software, implementation of hardware, or a combination of software and hardware, is also possible and contemplated.

Figure 3:
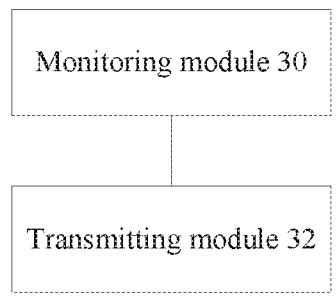
FIG. 3 is a structural block diagram of a device for monitoring an active state of a node according to an embodiment of the present disclosure.

FIG. 3 is a structural block diagram of a device for monitoring an active state of a node according to an embodiment of the present disclosure, as shown in FIG. 3, the device applied to a first node includes a monitoring module 30 and a transmitting module 32.

The monitoring module 30 is configured to monitor an active state of the second node, where the first node and the second node are cooperative nodes to each other.

The transmitting module 32 is configured to transmit a notification message indicating that the second node is offline to a central node, when the active state indicates that the second node is offline.

Figure 4:
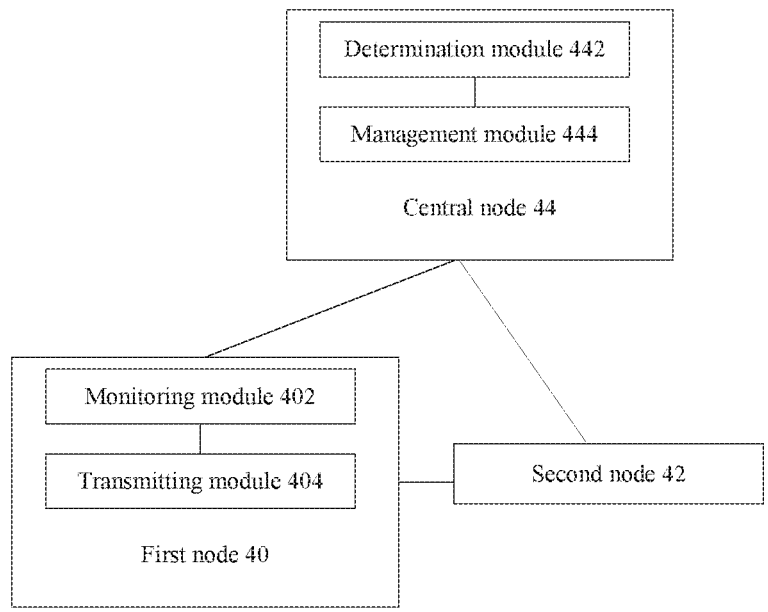
FIG. 4 is a structural block diagram of a system for monitoring an active state of a node according to an embodiment of the present disclosure.

FIG. 4 is a structural block diagram of a system for monitoring an active state of a node according to an embodiment of the present disclosure, as shown in FIG. 4, the system includes a first node 40, a second node 42 and a central node 44.

The first node 40 includes a monitoring module 402 and a transmitting module 404.

The monitoring module 402 is configured to monitor an active state of the second node, where the first node and the second node are cooperative nodes to each other.

The transmitting module 404 is configured to transmit a notification message indicating that the second node is offline to a central node, when the active state indicates that the second node is offline.

The central node 44 includes a determination module 442 and a management module 444.

The determination module 442 is configured to determine the offline state of the second node, after receives the notification message.

The management module 444 is configured to adjust a cooperation relationship of nodes subordinate to the central node according to a current topology state of a network comprising the first node and the second node, and a cooperative state of at least one of the first node or the second node.

In this embodiment, the second node 42 and the first node 40 have same functions and may execute same operations, the above description is made only from the first node side, and the second node is similar, which will not be repeated here.

It should be noted that each of the above modules may be implemented by software or hardware, and the latter may be implemented by following methods, but is not limited thereto: the above modules are all located in a same processor; alternatively, the above modules as any combination may be located in different processors.

Embodiment Three

This embodiment is an alternative embodiment of the present disclosure and is used to explain the solution of the present application in detail with specific embodiments:

this embodiment describes the purpose of active monitoring among cooperative nodes, that is, to discover an offline node in time, and the central node may handle the situation of a network topology change in time to prevent a certain node from losing one of its cooperative nodes for a long time.

This embodiment describes rules for determining active of the other party among cooperative nodes, i.e. when active information is not received within a certain time period, the other party is determined to be offline. The present disclosure further provides rules for a central node to determine whether a cooperation relationship needs to be adjusted. That is, the central node determines that it is necessary to adjust the cooperation relationship of the nodes subordinate to the central node as long as any cooperative node of the offline node has no other active cooperative node.

In a network where a relationship between the central node and cooperative nodes has been determined, cooperative nodes of each pair are monitored by each other according to an embodiment of a method for monitoring node active first; if any node detects that its cooperative node is offline, the node reports an offline condition of the cooperative node to the central node; it is determined whether at least one cooperative node is selected according to whether each of all cooperative nodes of the offline node still has at least one active cooperative node, which is based on steps in an embodiment of a method for processing an offline node.

This embodiment is applicable to the network where the relationship between the central node and the cooperative nodes has been determined. Where, a number of cooperative nodes for each node may be within a range of 0 to 2, and the active state of the other party between cooperative nodes is monitored by transmitting the active information to each other. The central node receives an offline message from any node in the network and processes it.

The present embodiment includes following embodiments.

The embodiment of a method for monitoring node active

The present embodiment provides a method for monitoring node active, which may discover an offline device in time by monitoring a active condition of a cooperative node, so that a central node may process the offline device in time.

The active information of a node includes:
1. time of last generation of the active information by the node
2. time of current generation of the active information by the node T is defined as a time interval between generation of the active information and transmission of the active information, when the node operates normally. This time interval needs to be mutually appointed by cooperative nodes according to network conditions and conditions of the cooperative nodes after the cooperative nodes are selected. Different pairs of cooperative nodes in the network may have different time intervals.

Figure 5:
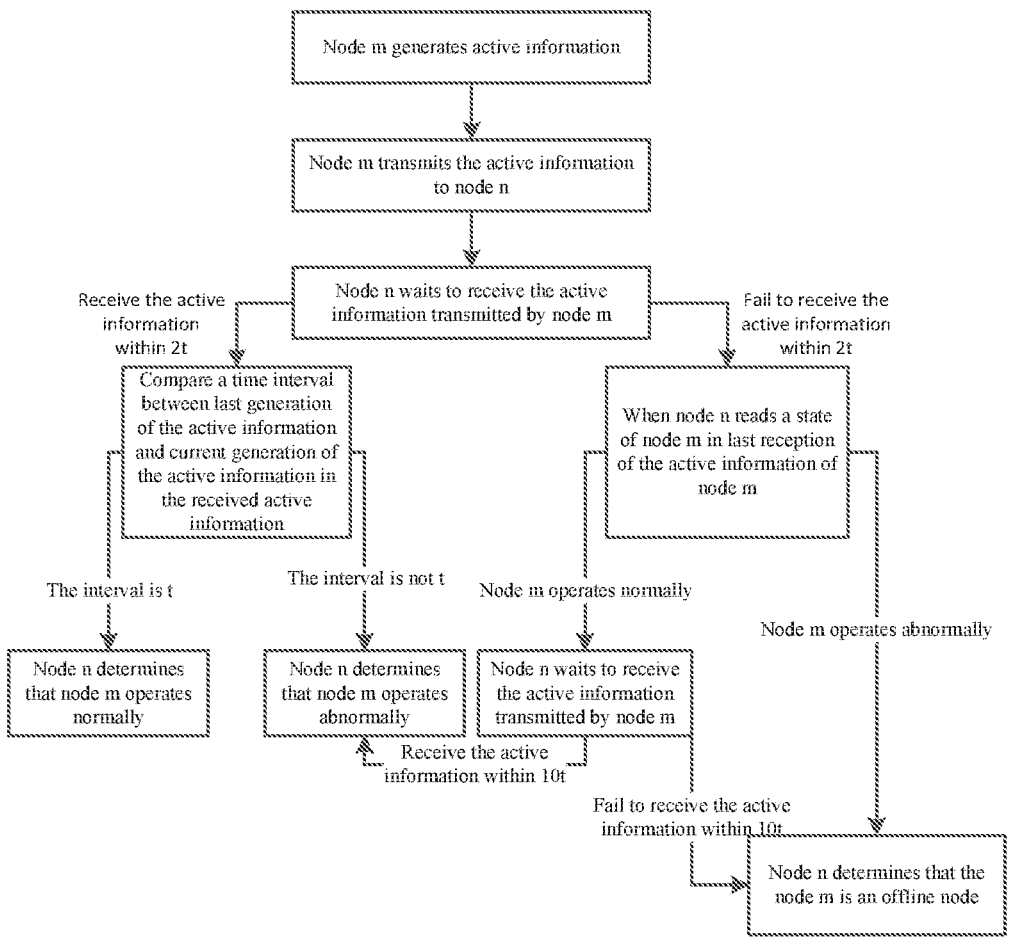
FIG. 5 is a schematic diagram of a node active information transmission flow according to an embodiment.

FIG. 5 is a schematic diagram of a node active information transmission flow according to the embodiment, which is a monitoring process between any pair of cooperative nodes in the network, and all cooperative nodes in the network need to implement this process. Node m and node n are cooperative nodes to each other, the process includes steps described below.

Step S101: node m generates active information.

Step S102: node m transmits the active information to node n.

Step S103: node n waits to receive the active information transmitted by node m, if the active information is received within 2 t, and a time interval between the last generation of the active information and the current generation of the active information in received active information is T, node n determines that node m operates normally.

Step S104: node n waits to receive the active information transmitted by node m, if the active information is received within 2 t, and the time interval between the last generation of the active information and the current generation of the active information in the received active information is greater than T, node n determines that node m operates abnormally.

Step S105: node n waits to receive the active information transmitted by node m, if no active information is received within 2 t, it is determined that node m operates abnormally in last reception of the active information of node m by node n, node n determines that node m is an offline node.

Step S106: node n waits to receive the active information transmitted by node m, if the active information has not been received within 2 t, and it is determined that node m operates normally in the last reception of the active information of node m by node n, step S107 is executed.

Step S107: node n waits to receive the active information transmitted by node m, if the active information is received within 10 t, it is determined that node m operates abnormally, if no active information is received within 10 t, node n determines that node m is an offline node.

As an alternative solution, when a node has weak computing and storage capacity, the node may not store time of last generation of the active information by the node and time of current generation of the active information by the node, while generates the active information, the active information may not contain these two pieces of information. The steps of the embodiment for monitoring node active become:

Step S301: node m generates active information.

Step S302: node m transmits the active information to node n.

Step S303: node n waits to receive the active information transmitted by node m, if the active information is received within 2 t, node n determines that node m operates normally.

Step S304: node n waits to receive the active information transmitted by node m, if no active information is received within 2 t, node n determines that node m is an offline node.

The above process is only a one-way process for node n to monitor node m, and node m may monitor node n with a same process to make monitoring bidirectional.

The embodiment of a method for processing an offline node

Figure 6:
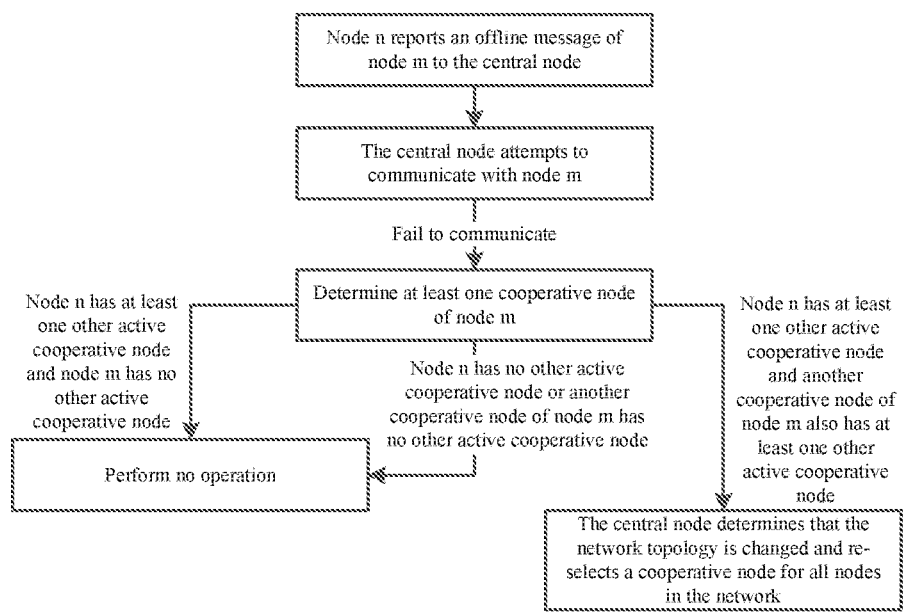
FIG. 6 is a flowchart of processing an offline node by a central node according to an embodiment.

This embodiment needs to be executed after the offline node is monitored by the embodiment of the method for monitoring node active. After node n detects that its cooperative node m is offline using the method for monitoring node active, FIG. 6 is a schematic flow diagram of processing an offline node by the central node provided in this embodiment, the steps need to be performed between node n and the network central node include steps described below.

Step S201: node n reports an offline message of node m to the central node.

Step S202: after receiving the offline message of node m, the central node attempts to communicate with node m, if it is confirmed that the node m is offline, step S203 is executed.

Step S203: if node n has at least one other active cooperative node and node m has no other active cooperative node, the central node performs no operation; if node n has at least one other active cooperative node and another cooperative node of node m also has at least one other active cooperative node, the central node performs no operation; if node n has no other active cooperative node or another cooperative node of node m has no other active cooperative node, the central node determines that the network topology is changed and a cooperative node for all nodes in the network is re-selected.

According to the present embodiment, the method for monitoring a active cooperative node is provided. According to the monitoring method, when a certain node or link in the network is abnormal, an offline node may be monitored and processed in a more timely manner, and the response speed of the network to a node abnormality is improved. Through the embodiment of the method for monitoring node active, whether a cooperative node is offline may be monitored in time, so that the embodiment of the method for processing an offline node may be executed in time. The embodiment of the method for processing an offline node may timely response to a network topology change caused by the offline node, so that the central node may select at least one new cooperative node for all affected nodes as quickly as possible.

An application scenario of this embodiment includes but is not limited to, for example, in a smart power grid, the network periodically collects data in various gateways in the grid. A network failure may be caused by a gateway failure or a failure of a power supply device connected to the gateway. Especially when a power supply device fails, if the problem may not be found as early as possible, which may result in a cascade failure. However, the failure gateway may not report information in time, and the problem may not be discovered until a next data collection. However, the discovery and reporting mechanism of a cooperative node involved in this embodiment will facilitate an early discovery of the problem. However, in agricultural Internet of Things with a large coverage area, it is difficult to find after a node fails, at the same time, a failure of some key nodes may lead to a network isolation. Therefore, it is necessary that through the method provided by the present disclosure the active information is determined using a cooperative node and reported to the management center in time for further processing.

Embodiment Four

The embodiments of the present disclosure further provide a storage medium. It is applied to a first node, in this embodiment, the above storage medium may be configured to store program codes for executing following steps:

S1, an active state of a second node is monitored, where the first node and the second node are cooperative nodes to each other;

S2, when the active state indicates that the second node is offline, a notification message indicating that the second node is offline is transmitted to a central node.

In an embodiment, in this embodiment, the above storage medium may include, but is not limited to, a U disk, a ROM, a RAM, a removable hard disk, a magnetic disk or an optical disk, and other various media that may store program codes.

In an embodiment, in this embodiment, a step in which an active state of the second node is monitored is executed by a processor according to the program codes stored in the storage medium, where the first node and the second node are cooperative nodes to each other;

In an embodiment, in this embodiment, a step in which a notification message indicating that the second node is offline is transmitted to the central node, when the active state indicates that the second node is offline is executed by the processor according to the program codes stored in the storage medium.

In an embodiment, specific embodiments of the present embodiment may refer to the embodiments described in the above-mentioned embodiments and alternative embodiments, and this embodiment will not repeat here.

Obviously, those skilled in the art should understand that the above-mentioned modules or steps of the present disclosure may be implemented by a general-purpose computing device, they may be concentrated on a single computing device, or distributed in a network including multiple computing devices, alternatively, they may be implemented by program codes executable by a computing device, so that they may be stored in a storage device for execution by a computing device, and in some cases, the steps shown or described may be performed in a sequence different from that herein, or they may be separately fabricated into individual integrated circuit modules, alternatively, multiple modules or steps among them may be fabricated into a single integrated circuit module. So, the present disclosure is not limited to any specific combination of hardware and software.

The above description is only an embodiment of the present disclosure and is not intended to limit the present disclosure, various modifications and changes may be made to the present disclosure for those skilled in the art. Any modification, equivalent substitution, improvement, and so on made within spirits and principles of this disclosure shall be included within the protection scope of the present disclosure.

INDUSTRIAL PRACTICABILITY

The present disclosure is applicable to the field of communications, and is configured to improve the response speed of the network to a node abnormity.

What is claimed is:

1. A method for monitoring an active state of a node, comprising:
    monitoring, by a first node, an active state of a second node, wherein the first node and the second node are cooperative nodes to each other;
    in a case of the active state indicating that the second node is offline, transmitting, by the first node, a notification message indicating that the second node is offline to a central node in a same network comprising the first node and the second node;
    determining, by the central node, an offline state of the second node; and
    adjusting, by the central node, a cooperation relationship of nodes subordinate to the central node according to a current topology state of the network, and a cooperative state of at least one of the first node or the second node.

2. The method according to claim 1, wherein determining, by the central node, the offline state of the second node comprises:
    performing, by the central node, an attempt to communicate with the second node; and
    in a case where the attempt to communicate with the second node fails, determining, by the central node, a current state of the second node as the offline state.

3. The method according to claim 1, wherein adjusting, by the central node, the cooperation relationship of the nodes subordinate to the central node according to the current topology state of the network and the cooperative state of the first node comprises one of:
    in a case of the first node having at least one other active cooperative node, keeping, by the central node, the cooperation relationship of the nodes subordinate to the central node; or
    in a case of the first node having no other active cooperative node, re-selecting, by the central node, a cooperative node for the nodes subordinate to the central node.

4. The method according to claim 1, wherein adjusting, by the central node, the cooperation relationship of the nodes subordinate to the central node according to the current topology state of the network and the cooperative state of at least one of the first node or the second node comprises one of:
    in a case of the first node having at least one other active cooperative node and the second node having no other active cooperative node, keeping, by the central node, the cooperation relationship of the nodes subordinate to the central node;
    in a case of the first node having at least one other active cooperative node and a third node having no other active cooperative node, keeping, by the central node, the cooperation relationship of the nodes subordinate to the central node; or
    in a case of the first node having no other active cooperative node, or the third node having no other active cooperative node, re-selecting, by the central node, a cooperative node for the nodes subordinate to the central node;
    wherein the third node is a cooperative node of the second node and is comprised in the network comprising the first node and the second node.

5. The method according to claim 1, wherein before transmitting the notification message indicating that the second node is offline to the central node, the method further comprises:
    determining, by the first node, a current state of the second node as an offline state according to the active state.

6. The method according to claim 1, wherein monitoring, by the first node, the active state of the second node comprises:
monitoring, by the first node, the active state of the second node according to received active information of the second node.

7. The method according to claim 6, wherein monitoring, by the first node, the active state of the second node according to the received active information of the second node comprises one of:
monitoring, by the first node, the active state of the second node according to first time between last reception of the active information of the second node from the first node and current reception of the active information of the second node from the first node; or
monitoring, by the first node, the active state of the second node according to second time between last generation of the active information by the second node and current generation of the active information by the second node.

8. The method according to claim 7, wherein monitoring, by the first node, the active state of the second node according to the received active information of the second node comprises one of:
in a case of the first time being less than a first threshold and the second time being less than a second threshold, determining, by the first node, the active state of the second node as a normal state;
in a case of the first time being less than the first threshold and the second time being greater than or equal to the second threshold, determining, by the first node, the active state of the second node as an abnormal state;
in a case of the first time being greater than or equal to the first threshold and the active state of the second node being the abnormal state in a last monitoring period, determining, by the first node, the active state of the second node as an offline state;
in a case of the first time being greater than or equal to the first threshold and the active state of the second node being the normal state in the last monitoring period, determining whether the first time is greater than a third threshold, and in response to determining that the first time is less than the third threshold, determining the active state of the second node as the abnormal state; or
in a case of the first time being greater than or equal to the first threshold and the active state of the second node being the normal state in the last monitoring period, determining whether the first time is greater than the third threshold, and in response to determining that the first time is greater than the third threshold, determining the active state of the second node as the offline state.

9. The method according to claim 8, wherein the third threshold is greater than each of the second threshold and the first threshold.

10. The method according to claim 7, wherein monitoring, by the first node, the active state of the second node according to the received active information of the second node comprises one of:
in a case of the first time being less than a first threshold, determining, by the first node, the active state of the second node as a normal state; or
in a case of the first time being greater than or equal to the first threshold, determining, by the first node, the active state of the second node as an offline state.

11. The method according to claim 1, further comprising:
receiving, by the first node, active information transmitted by the second node.

12. The method according to claim 1, wherein the central node is determined in one of following manners: calculation according to a preset relationship, designation by the network or a user.

13. The method according to claim 1, wherein each node is one of a terminal or a gateway.

14. A device for monitoring an active state of a node, applied to a first node, comprising:
a processor; and
a memory for storing instructions executable by the processor,
wherein the processor is configured to:
monitor an active state of a second node, wherein the first node and the second node are cooperative nodes to each other; and
in response to the active state indicating that the second node is offline, transmit a notification message indicating that the second node is offline to a central node in a same network comprising the first node and the second node such that the central node determines an offline state of the second node and adjusts a cooperation relationship of nodes subordinate to the central node according to a current topology state of the network, and a cooperative state of at least one of the first node or the second node.

15. A system for monitoring an active state of a node, comprising:
a first node, a second node and a central node which are in a same network;
wherein the first node comprises:
a processor; and
a memory for storing instructions executable by the processor,
wherein the processor is configured to:
monitor an active state of the second node, wherein the first node and the second node are cooperative nodes to each other; and
transmit a notification message indicating that the second node is offline to the central node in response to the active state indicating that the second node is offline;
wherein the central node comprises:
a processor; and
a memory for storing instructions executable by the processor,
wherein the processor is configured to:
determine an offline state of the second node after receiving the notification message; and
adjust a cooperation relationship of nodes subordinate to the central node according to a current topology state of a network comprising the first node and the second node, and a cooperative state of at least one of the first node or the second node.

* * * * *